United States Patent [19]

Morin

[11] 4,358,639
[45] Nov. 9, 1982

[54] PERMANENT SIGNAL HOLDING MODULE

[76] Inventor: Joseph P. Morin, 2424 Rockwell Ave., Baltimore, Md. 21228

[21] Appl. No.: 179,230

[22] Filed: Aug. 18, 1980

[51] Int. Cl.³ .................... H04M 3/14; H04M 3/22
[52] U.S. Cl. .......................... 179/22; 179/175.2 R
[58] Field of Search ............... 179/19, 20, 22, 18 F, 179/18 FA, 175.1 R, 175.2 C, 175.2 R, 27 G

[56] References Cited

U.S. PATENT DOCUMENTS

| | | | |
|---|---|---|---|
| 2,525,840 | 10/1950 | Sterrett et al. | 179/19 |
| 2,650,950 | 9/1953 | Kessler | 179/18 F |
| 3,156,777 | 11/1964 | Horwitz et al. | 179/18 F |
| 3,378,642 | 8/1968 | Gagnier et al. | 179/18 F |
| 3,699,265 | 10/1972 | Altenburger | 179/19 |
| 3,705,959 | 12/1972 | Swanson | 179/18 F |
| 3,875,342 | 4/1975 | Stern | 179/18 F |
| 3,875,351 | 4/1975 | Kennedy | 179/175.3 R |
| 3,883,698 | 5/1975 | Catterall | 179/18 F |

*Primary Examiner*—Thomas W. Brown
*Attorney, Agent, or Firm*—Eugene F. Osborne, Sr.

[57] ABSTRACT

A manually assisted lockout relay circuit is used in a telephone switching facility to disconnect and isolate an offending subscriber's telephone line to prevent it from capturing and holding central exchange equipments that are commonly accessible and needed by a plurality of other subscribers. A central office technician, through use of the master test frame, determines that the offending subscriber has removed the telephone handset from its hook or cradle and has not made an attempt to complete a call. An offending subscriber, for whatever reason, persists for long periods of time, and on repeated occasions, in leaving his handset off hook. In such instances the technician energizes the lockout relay, by application of central office high voltage, to isolate the offending subscriber's line from the system. Replacement of the handset by the offending subscriber resets the circuit for normal operation. Inadvertent lockout in normal operation is prevented by a zener diode in series with the lockout relay. The lockout circuit is in modular form with plug-in and wired connections. A specific design has been made for use with the popular #5 crossbar exchange offices.

10 Claims, 6 Drawing Figures

PERMANENT SIGNAL HOLDING MODULE

BACKGROUND OF THE INVENTION

1. Field of the Invention

This invention relates to the protection of central office telephone switching apparatus from uneconomical tie up for long periods at times when a subscriber's line loop remains closed because the telephone handset is left off hook. Central office equipment is complex and expensive. It is for use when required but should not be tied up when there is no flow of communications. Experience has shown that a small percentage of subscribers will repeatedly, and for various reasons, intentionally leave the handset off the hook without attempting to place or complete a call within an allocated time interval. This condition creates a permanent signal that will tie up channels of the central office switching facilities and preclude their use by other subscribers. Common equipment in the central office is sufficient for normal traffic; however, a relatively small number of permanent signals is capable of blocking all traffic through the central exchange. It is desirable to identify the offending subscriber and the off hook condition and to release the subscriber's line circuit if his loop remains closed for prolonged intervals in which no attempt is made to complete a call.

The invention is applicable to manned telephone exchanges where a technician on duty is alerted by signals at the master test frame that an excessive number of subscribers have been routed to the permanent signal trunks. Tests are made by the technician to determine the cause of repeated trouble. If it is due to a receiving handset off hook the subscriber's line can be disconnected from the office equipment for the duration of each off hook condition if a permanent signal holding module, as embodied in this invention, is connected to his line. In #5 crossbar exchange offices the module is placed permanently on the lines of habitual offenders.

2. Description of the Prior Art

In the past one way to provide lockout has been to install extra automatic circuitry and relay devices in each line circuit of the plurality of suscribers. This is economically unattractive in view of the relatively small number of offenders and a very large number of total subscribers. Special effort has been made by other inventors to achieve balanced loads in each conductor of the line circuit to minimize noise. Another approach has been to connect the line circuit to a permanent signal trunk which is terminated so as to provide a high tone signal to the line and a busy signal to other subscribers.

SUMMARY OF THE INVENTION

In telephone communications between a multiplicity of subscribers, interconnection between a caller and a dialed addressee is made by central exchange office equipment which is complex and expensive. In practice the number of channels of communication active at any time is a fraction of the total number of subscribers. For economy the central office is designed to share common facilities among the total subscribers. A channel of the common exchange equipment is held by each subscriber when the handset is removed from the holding hook; the removal from the hook closing a switch to complete the loop of the line circuit and establishing a permanent signal. A relatively small number of handsets off hook can seriously limit the switching capability of the exchange, thereby blocking communications through the central office. Fortunately the majority of telephone subscribers use this instrument correctly. Occasionally a subscriber line may develop a shorted condition or the subscriber may inadvertently or accidentally fail to properly replace the handset on the hook or cradle. These occasional conditions are acceptable for the central exchange. However, in any population of subscribers there are some users that intentionally and deliberately leave the handset off hook for extended periods.

An object of this invention is to provide a method of identifying and locking out a limited number of deliberate and habitual offenders who leave their handsets off hook so as to release common exchange equipment for use by bona fide subscribers.

Another objective of this invention is to provide a semi-automatic means for manned central exchange offices to lock out habitual offending subscribers.

A further objective of this invention is to provide a lockout circuit in the form of a permanent signal holding module which can be permanently installed by the central office technician on the lines of the habitual offender.

A further objective of this invention is to provide an isolation device for habitual offending subscribers' lines that retains the full communication performance of the telephone circuits in terms of module insertion loss, balance and noise figures when normal telephone calls are being made over the two way paths.

A further objective of this invention is to provide a modular lockout circuit specifically for use with the Type #5 crossbar central office as an add-on device that may be installed without major alteration of existing hardware.

Additional objectives and advantageous features will be obvious from the description of the invention.

To achieve these objectives an electrical circuit comprising a single winding multiple contact relay, a resistor and a zener diode are arranged on a printed circuit module for plug-in connection to the subscriber's line. Permanent wiring is made to the sleeve (s), hold magnet (hm), ring (R), and negative 48 volt functions. On indication of trouble due to a handset left off the hook, the central office technician by operation of the coin collect (CC) key as patched into master test frame jack circuits applies positive 130 volts dc to the tip (T) line which operates the lockout relay through the zener diode, thereby isolating the offending subscriber's line and placing ground on the line hold (LH) lead to make the line look busy.

BRIEF DESCRIPTION OF THE DRAWINGS

Further details are described below with the help of the illustrations in the attached drawings in which.

DESCRIPTION

Figure 1:
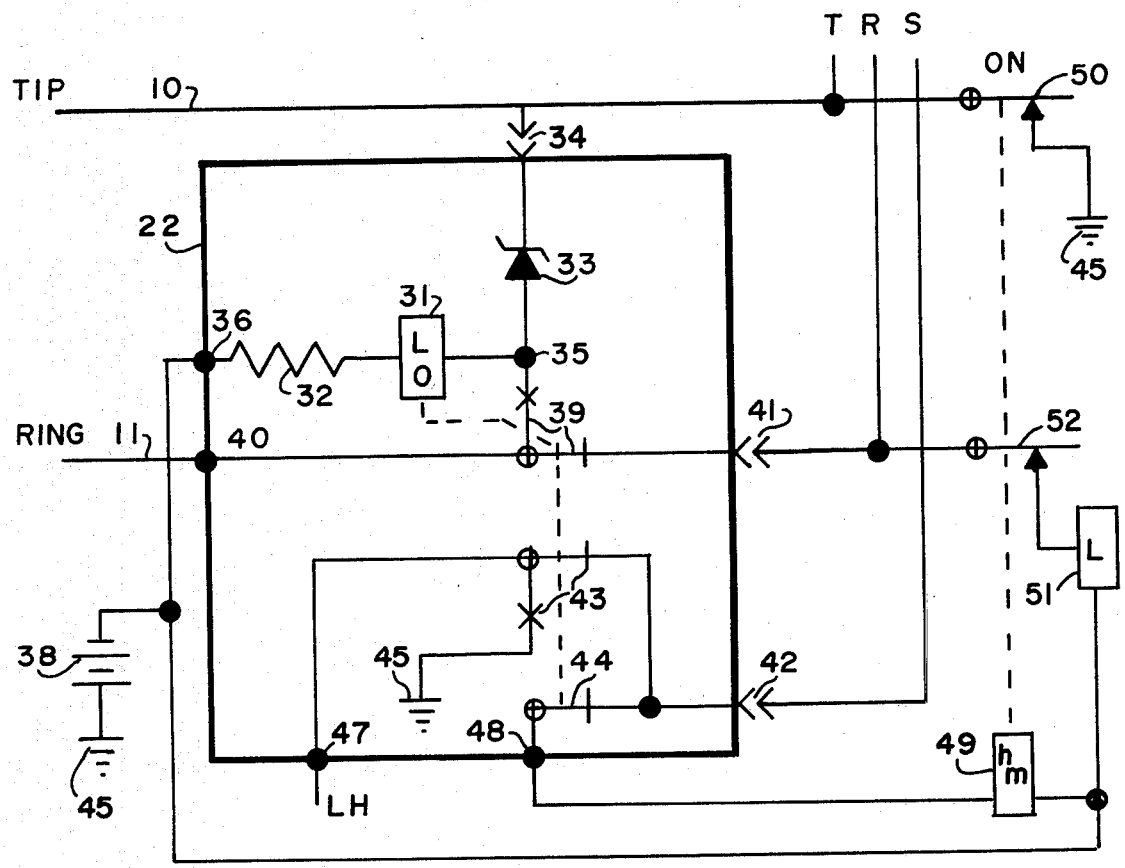
FIG. 1 is an electrical schematic of the preferred embodiment of a permanent signal holding module for a #5 crossbar central office according to the present invention.
Figure 2:
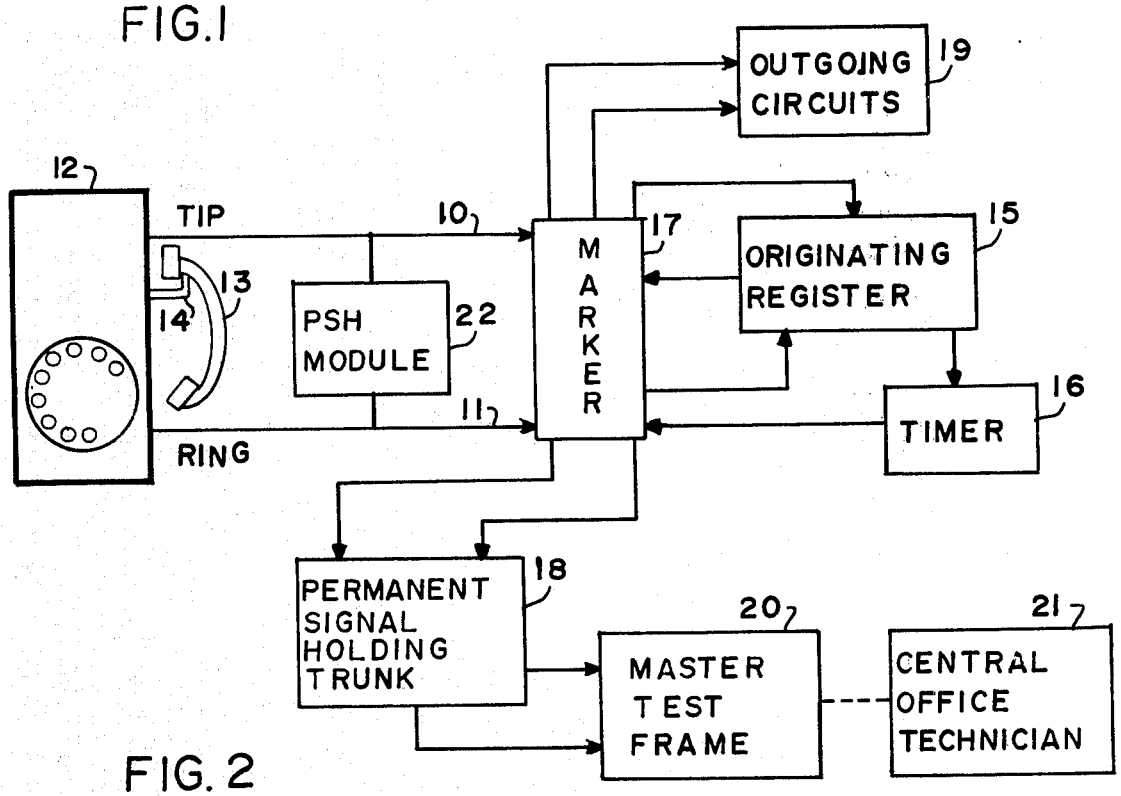
FIG. 2 is a block diagram of a portion of a telephone communication system illustrating a subscriber line connected to functional apparatus of a #5 crossbar central exchange office.

Referring initially to FIG. 2 there is shown in functional diagram form a portion of central exchange office equipment with connection to a representative subscriber's line 10, 11 and telephone set 12. The detailed construction and operation of standard telephone system apparatus will not be described herein as the construction and operation are well-known among those persons skilled in the telepone industry. U.S. Pat. No. 2,585,904 issued Feb. 19, 1952 to A. J. Busch describes in detail the #5 crossbar telephone system.

When the subscriber takes his handset 13 off the hook (or cradle) 14 but does not dial a complete number, the originating register 15 is timed out by timer 16 after approximately 25 seconds. The "timed out" originating register 15 signals the completing marker 17 that no number was dialed. The marker 17 disconnects the subscriber's line 10, 11 from the originating register 15 and connects it to a permanent signal holding trunk 18 until such time as the subscriber returns the handset 13 to its hook (or cradle) 14. Had a correctly dialed number been completed, the originating register 15 would have signaled the marker 17 to connect the subscriber line 10,11 to the outgoing circuits 19 for completion of the call. For supervision and maintenance of the system a master test frame 20 is provided in the exchange for use by the attending central office (C.O.) technician 21. The improvement in the invention is embodied in a permanent signal holding (PSH) module 22 which serves to disconnect and isolate the offending subscriber 12 from the complex and scarce equipment of the central exchange office.

Figure 3:
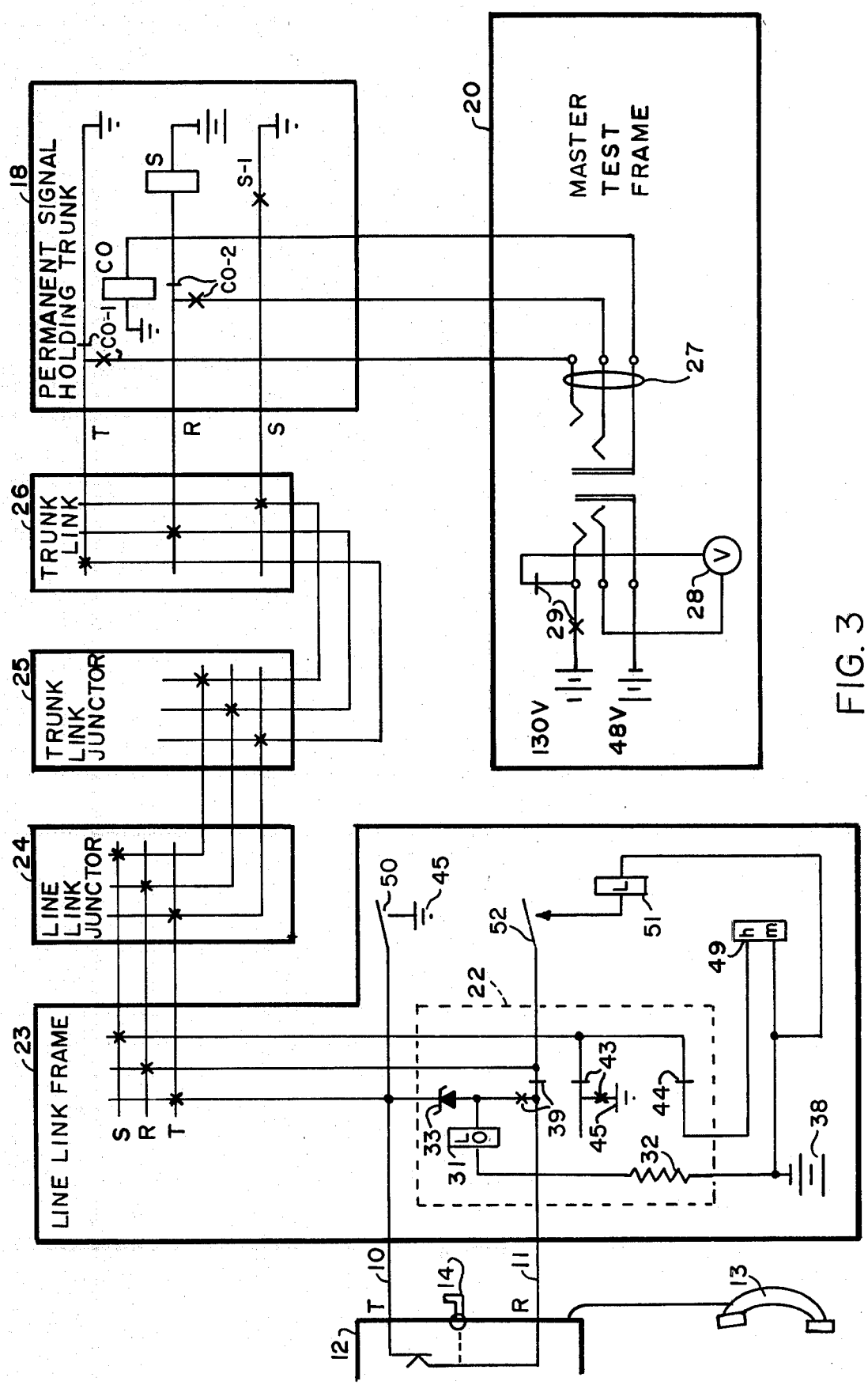
FIG. 3 is a block representation of switching function in a #5 crossbar central office illustrating the relationships between the subscriber's line with applied permanent signal holding module, line and trunk links and junctors, permanent signal holding trunk and master test frame circuits.
Figure 4:
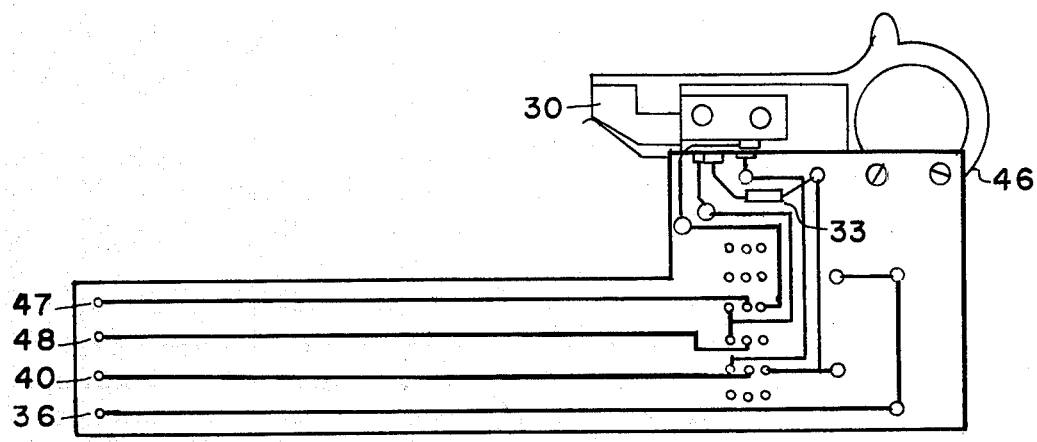
FIG. 4 is a first side elevation view of a permanent signal holding module as assembled according to the preferred embodiment described herein.
Figure 5:
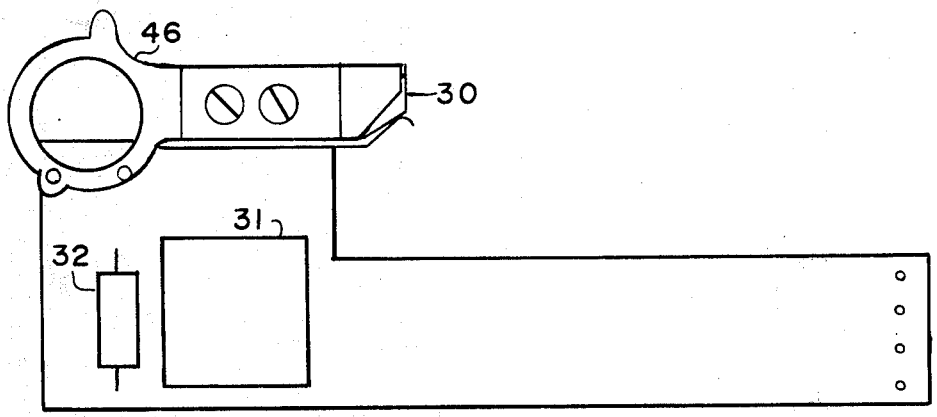
FIG. 5 is a second side elevation view of a permanent signal holding module as assembled according to the preferred embodiment described herein.
Figure 6:
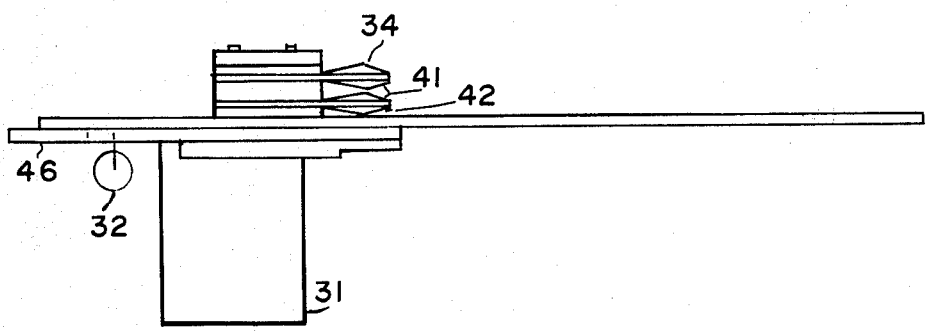
FIG. 6 is a top view of a permanent signal holding module as assembled according to the preferred embodiment described herein.

A further illustration of the condition where the subscriber has left his handset 13 off hook 14 is shown in FIG. 3 which illustrates the routing of the subscriber's tip (T) 10 and ring (R) 11 conductors from the line link 23 via switching apparatus of the central exchange through the Line link junction 24, the trunk link junctor 25, trunk link 26, to a PSH trunk 18. The jack 27 and voltmeter 28 circuits of the master test frame 20 allow the central office technician 21 to observe the conditions of the PSH trunk 18 and provide a means for establishing that the subscriber has left his handset 13 off hook 14. For pay phone subscribers the technician 21 is provided a coin (CC) key 29 for remotely collecting or returning a coin in a jammed condition at a pay booth by application of the appropriate positive or negative 130 volts dc to the tip (T) conductor 10 of the subscribers's line. The PSH module 22 is designed to supplement the central exchange apparatus by selective incorporation into the line link from 23 at local termination of known offending subscriber's lines.

Referring now to FIG. 1 and FIGS. 4, 5 and 6, the PSH module 22 is a printed circuit assembly that in the preferred embodiment of the invention includes a plug-in connector 30 of the stacked multiple leaf type, a multiple contact double-throw relay 31, a resistor 32, a Zener diode 33 and printed circuit means for semi-permanent wiring to exchange and subscriber functions.

Beginning at the connector 30, terminal 34 connects from the tip conductor 10 of subscriber's line to the cathode of a (nominal 100 volt Zener diode 33, the anode of said diode 33 being connected through printed circuit wiring to a junction 35. The junction 35 leads to a first terminal of the coil of lock-out relay 31. The second terminal of the coil of lock-out relay 31 connects through resistor 32 and printed wiring to printed circuit terminal 36 which is permanently "solder" wired, on installation of the module 22 in the line link frame, to the central exchange negative 48 volt dc power supply battery 38. The #5 crossbar exchange uses a "positive" ground system. The positive terminal of said 48 volt dc power supply battery 38 is wired to ground in the central exchange. Continuing from said printed wiring junction 35, a printed connection is made to a normally open terminal of double throw contacts 39 of said lock-out relay 31. The moving element of contacts 39 is wired via printed circuit to printed terminal 40 for permanent "solder" wiring to the subscriber's ring (R) conductor 11. The normally made terminal of contacts 39 is wired to terminal 41 of the plug-in connector 30 for connection to the subscriber's exchange R conductor 11. The sleeve (S) conductor 42 enters the module 22 via terminal 42 of the plug-in connector 30 and is wired to normally made terminals of both double throw contacts 43 and single throw contacts 44. The normally open terminal of contacts 43 is wired to system ground 45 via the module handle assembly 46. Moving element of contacts 43 connects to printed terminal 47 for "solder" wiring to sleeve operation of line hold (LH) relay. Moving element of single-throw contacts 44 connects to printed terminal 48 for "solder" wiring to a hold magnet (HM) relay 49 located elsewhere in the central exchange.

The permanent signal holding module 22 as described and shown in FIGS. 1, 4, 5 and 6 is a specialized lock-out device for use in #5 crossbar exchange offices to reduce the number of held channels caused by persons who intentionally leave their phones 13 off the hook 14. Without the module 22 the off-hook condition closes an electrical loop through the subscriber's tip 10 and ring 11 conductors and results in holding central exchange switching apparatus as illustrated in FIG. 3 for the duration of the off-hook condition. In normal operation signals at the master test frame 20 are available to alert the central office technician 21 that an excessive number of subscribers have been routed to the permanent signal trunk 18. The technician 21 can make tests to determine the cause of excessive loading of the permanent signal trunk 18. If the trouble incident is due to a specific telephone handset 13 off the hook 14, that subscriber's line can be isolated from the channels and switching apparatus of the central exchange commonly used by subscribers generally, if a permanent signal holdng module 22 is connected to the offending subscriber's line.

In practice the central office technician 21, using the voltmeter test circuit 28 of the master test frame 20 and procedures well known in central office having #5 crossbar equipment, jacks into the permanent signal trunks 18 to observe if the trouble is due to handsets 13 off the hook 14. Over a suitable period of time the technician 21 will develop a record of observations of off hook conditions to establish that a particular subscribers's line 10,11 should be classified as an habitual offender. Thereupon the technician 21 is instructed to install a PSH module 22 on a semi-permanent basis by plug-in and hard wiring to the offending subscriber's line at its location in the line link frame 23 of the central office.

Thereafter as part of routine central office procedure the technician 21 on observing the subscriber's handset 13 off the hook 14, by use of the master test frame 20 and voltmeter test circuit 28, operates the coin collect (CC) key 29. Operation of the coin collect key 29 sends positive 130 volt dc to the tip (T) conductor 10 of the subscriber's line to energize the lock out relay 31 of the PSH module 22 by current flow through the (100 volt) Zener diode 33, the coil of said relay 31, resistor 32 and battery 38. In normal modes the Zener diode 33 isolates the tip (T) conductor of the line from the negative 48 volts of the battery 38 through the winding of the lockout relay 31. When the technician 21 uses the coin key 29 to operate the lockout relay 31, by application of the positive volt dc, said lockout relay 31 electrically latches in the operated condition to current flow from the negative 48 volt battery 38, through resistor 32, winding of said relay 31, contacts 39, subscriber's ring (R) and tip (T) conductors 11 and 10 respectively to positive ground 45 at line link off-normal (ON) switch 50. When said lockout relay 31 operates, contacts 39 disconnect the subscriber's ring (R) conductor 11, thereby releasing all held channels and switches. The hold magnet 49 conductor is opened by operation of contacts 44 while operation of contacts 43 places ground 45 on the sleeve terminal 47 of the PSH module 22 which connects to the subscriber's line-hold (LH) function. This makes said subscriber's line appear busy to incoming calls. Whenever the subscriber returns and replaces his handset 13 to its hook 14 the loop is broken, lockout relay 31 is released, and the subscriber's line is automatically restored for normal operation.

While the principles of the invention and its operation have been described in connection with specific apparatus, it is to be clearly understood that this description is made by way of example and is not a limitation on the scope of the invention nor the assembly of the components of the combination. Variations will be obvious to persons skilled in the art without departing from the invention. For example, the method of holding an improperly used subscriber's telephone line from channels of a central exchange office may be substantially automated with modifications of the PSH trunks and the use of microprocessor scanning and data storage for analysis by an office computer, thereby replacing technician functions except for actual installation of modular circuits and components.

I claim:

1. A method of selectively holding an improperly used subscriber's telephone line from apparatus internal of a central exchange office which comprises the steps of:
   a. recording detections of off the hook incidents, over a period of time, for establishing an historical account that a specific subscriber is a habitual offender in the improper use of the telephone set and system, wherein a detection of an improper use is determined by monitor scanning the multiplicity of subscribers' lines within a permanent signal holding (PSH) trunk of a central exchange for continued presence of continuity through individual subscriber lines, each subscriber line comprising a pair of tip and ring conductors;
   b. installing a (PSH) module as an add-on modification to central office apparatus at the line link conductors of said subscriber known to be a habitual offender, said PSH module installed bridging said subscriber's line link tip and ring conductors, said PSH module further interposed in series with said ring conductor, said PSH module for holding off the hook offenses of said subscriber from using central office internal apparatus;
   c. detecting by said monitor scanning of pairs of tip and ring conductors of known habitual offenders whose lines are equipped with said PSH modules to determine that said subscriber's handset is currently off the hook, no call was attempted, and said subscriber is improperly holding central office apparatus;
   d. applying electrical energy by a temporary means to a normally isolated winding of a lockout relay assembled within said PSH module to energise said relay, said relay having multiple switching contacts, with at least one said switching contact set, normaly closed, in series with said ring conductor;
   e. latching said lockout relay to the energised state by flow of electrical current from a negative battery source through a series circuit comprising a resistor, said isolated winding and a set of made contacts of said lockout relay, thence through said offending subscriber's line, telephone set, and contacts of a hold magnet relay to a central office grounded return for said battery source;
   f. disconnecting said offending subscriber's telephone line by opening said switching contacts of said lockout relay normally closed in series with said ring conductor so that all held apparatus internal of said central exchange office are released for the duration of the off hook state of said subscriber's telephone handset; and
   g. restoring said subscriber's line to normal operation automatically after proper replacement of said subscriber's telephone handset to its holding hook or cradle, thereby terminating the offense, said replacement of the handset interrupting the flow of electrical current from said negative battery source through said winding of the lockout relay.

2. The method as defined by claim 1, which further comprises an additional step of:
   h. placing, simultaneously with said latching and disconnecting steps, ground potential on a line hold lead so as to show a busy signal to incoming calls addressed to said offending subscriber's line by means of a contact closure of said lockout relay.

3. The method as defined by claim 1, wherein said monitor scanning is carried out with a combination of supporting apparatus, operable by a technician in attendance, said combination of supporting apparatus comprising:
   a. a master test frame having a panel of jacks thereon, said jacks having means of connection to said tip and ring conductor pairs within said PSH trunk;
   b. apparatus of the exchange providing connecting means between aaid PSH trunk tip and ring conductors and selectable subscribers' tip and ring conductors as located at a line link frame of said central exchange office;

c. a voltmeter circuit adapted for connection to said jacks and thereby to selected tip and ring conductor pairs;

d. a means of sequentially connecting said voltmeter from jack to jack with dwell time upon each jack thereby connected; and e. a means of observing continuity between said tip and ring conductors by use of said voltmeter, whereby a sustained indication of continuity establishes an off hook state for said subscribers' handsets.

4. The method as defined by claim 3, wherein said means of sequentially connecting said voltmeter from jack to jack and said means of observing continuity between said tip and ring conductors by the use of said voltmeter comprise manual means responsive to a technician in attendance at said master test frame.

5. The method as defined by claim 1, wherein said step of applying electrical energy by a temporary means to a normally isolated winding of said lockout relay is carried out with a combination of supporting apparatus, operable by a technician in attendance, said combination of supporting apparatus comprising:

a. a master test frame having a panel of jacks thereon, said jacks having connectivity to tip conductors within said PSH trunk;

b. apparatus of the exchange providing connecting means between said PSH trunk tip conductors and selectable subscribers' tip conductors as located at a line link frame of said central exchange office;

c. a coin collect key adapted for connection to said jacks and thereby to selected tip conductors, said coin collect key providing a make while hold switching means to connect momentarily a high voltage source of exchange power, nominally positive 130 volts dc, through apparatus of said exchange to said subscriber's tip conductor and said PSH module;

d. a means of connecting said coin collect key through said panel of jacks, thence through exchange apparatus to specific tip conductors at said line link frame of those offending subscribers whose handsets are off the hook; and e. a means of operating said coin collect key whereby said high voltage power is applied to a selected PSH module to activate lockout of that subscriber's line.

6. The method as defined by claim 5, wherein said means of connecting said coin collect key through said panel of jacks and said means of operating said coin collect key whereby said high voltage is applied comprise manual means responsive to a technician in attendance at said master test frame.

7. A semi-automatic arrangement for a telephone communications system to permanently hold a subscriber's line from internal apparatus of a central exchange facility for the duration of an off hook condition of a subscriber's telephone handset, said arrangement comprising:

a. central exchange apparatus comprising conductors and switching devices for routing and connecting a multiplicity of subscribers' lines from a line link frame to a master test frame, said conductors and switching devices further comprising tip, ring and supervisory or sleeve channels;

b. said master test frame comprising means for support of manual detection and determination of a handset off the hook condition on any selected subscriber's line;

c. said master test frame further comprising means for temporary manual application of electrical energy via said tip channel to said line link frame for the disconnection and lockout of a selected subscriber's line;

d. a PSH module responsive to said temporary manual application of electrical energy via said tip channel to said line link frame comprising switching means for disconnecting a selected subscriber's line from said internal apparatus of a central exchange, switching means for opening a hold magnet lead and placing ground potential on a line hold (LH) lead so as to make said selected subscriber's line appear busy to incoming calls from other subscribers addressed to said selected subscriber's line, and switching means for latching up said module in its disconnect mode without sustained application of electrical energy via said tip channel for the duration of said off hook condition of said subscriber's handset, said module automatically responsive to proper replacement of said subscriber's handset to its supporting hook or cradle, so as to restore said selected subscriber's line to normal operation; and e. there being a technician in attendance at said central exchange, for scanning said subscribers' lines, detecting and determing specific off hook offenses, deciding on the necessity for corrective action, and for applying temporary electrical energy to said PSH module to disconnect and lockout a selected offending subscriber's line, said technician using supportive means of said master test frame.

8. An arrangement according to claim 7 wherein said master test frame means further comprise:

a. a plug-in jack panel operable by an attending technician for providing connectivity through said internal apparatus of the central exchange to specific subscriber telephone lines;

b. a voltmeter adapted for plug-in to said jack panel for supporting manual analysis by said attending technician of on or off hook conditions of selected subscribers' lines; and c. a coin collect key and switch adapted for plug-in to said jack panel, said key operable by said attending technician for applying a high potential electrical command signal, nominally positive 130 volts dc, via exchange connectivity to a tip (T) conductor of a selected subscriber's line, said high potential command signal for actuating disconnection by said PSH module of said subscriber's line from said internal apparatus of the central exchange.

9. An arrangement according to to claim 7, wherein said PSH module further comprises:

a. a current limiting resistor for connecting an off module negative voltage battery source to a first winding terminal of a switching relay;

b. said switching relay having multiple sets of double throw contacts, with a second winding terminal connected to a first wiring junction, thence to the anode of a Zener diode;

c. said Zener diode having a voltage rating of 100 volts dc, whose cathode is connected to a terminal of an interface electrical connector for said module, thence to a tip conductor of subscriber's line, said Zener diode providing a path for application of electrical energy in the form of a high potential at positive 130 volts dc for operating said switching relay, said Zener diode in normal modes of operation providing isolation of said tip conductor of said subscriber's line from said off module negative voltage battery source at 48 volts dc;

d. a first set of contacts of said switching relay connected normally closed (at the line link interface) in a ring (R) conductor of said subscriber's line and normally open between said ring conductor of said subscriber's line and said first wiring junction between the anode of said Zener diode and the second winding terminal of said switching relay, said first set of contacts providing disconnect of said subscriber's line from said internal apparatus of the exchange on operation of said switching relay and further providing a path for latching said switching relay in the disconnect mode for the duration of said off hook condition of said subscriber's handset;

e. a second set of contacts of said switching relay connected normally closed in a conductor between a sleeve (S) junction and a line hold (LH) lead and normally open to ground potential, said second set of contacts placing ground potential on said line hold lead for making said subscriber's line look busy to incoming calls from other subscribers for the duration of said off hook condition of said subscriber's handset; and f. a third set of contacts of said switching relay connected normally closed in a conductor between said sleeve (S) junction and a hold magnet (hm) relay located off said module, said third set of contacts for releasing said hold magnet relay, thereby completing a path through an off normal (ON) switch to ground potential for said latch up of said switching relay.

10. The arrangement according to claim 9, wherein said PSH module further comprises: a printed circuit assembly for use as an add-on in a #5 crossbar exchange, said printed circuit assembly having a multiple leaf connector for plug in to line link T,R,S and ground functions, and printed terminals for hard wiring at the rear of said line link frame to S, hm, R and negative 48 volt functions.

* * * * *